(12) United States Patent
Wetzel et al.

(10) Patent No.: US 6,918,365 B2
(45) Date of Patent: Jul. 19, 2005

(54) SYSTEM HAVING AN INTERNAL COMBUSTION ENGINE AND A FUEL CELL AND METHOD OF MAKING AND USING SAME

(75) Inventors: Franz-Josef Wetzel, Gernlinden (DE); Joachim Tachtler, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/662,479

(22) Filed: Sep. 16, 2003

(65) Prior Publication Data

US 2004/0060523 A1 Apr. 1, 2004

Related U.S. Application Data

(63) Continuation of application No. PCT/EP02/02260, filed on Mar. 2, 2002.

(30) Foreign Application Priority Data

Mar. 17, 2001 (DE) .......................................... 101 13 000

(51) Int. Cl.$^7$ ............................................... F02N 17/02
(52) U.S. Cl. ............................. 123/142.5 R; 123/41.14
(58) Field of Search ....................... 123/41.14, 142.5 R

(56) References Cited

U.S. PATENT DOCUMENTS

| 6,112,713 A | 9/2000 | Kiel | |
|---|---|---|---|
| 6,202,602 B1 * | 3/2001 | Genster et al. | .......... 123/41.44 |
| 6,276,473 B1 | 8/2001 | Zur Megede | |

FOREIGN PATENT DOCUMENTS

| DE | 19525661 A1 | 1/1997 |
|---|---|---|
| DE | 19703171 A1 | 8/1998 |
| DE | 19913794 A1 | 10/2000 |
| DE | 19913795 C1 | 10/2000 |
| JP | 07065849 | 3/1995 |
| JP | 08339816 | 12/1996 |
| JP | 11132105 | 5/1999 |
| JP | 2000303836 A | 10/2000 |

\* cited by examiner

*Primary Examiner*—Noah P. Kamen
(74) *Attorney, Agent, or Firm*—Crowell & Moring LLP

(57) ABSTRACT

A system comprising an internal combustion engine, which particularly serves to provide the locomotion of a vehicle, and a fuel cell, which serves, among other things, to generate current for electrical units of the vehicle is provided. In order to utilize the heat loss of the fuel cell when the vehicle is stationary as well as the residual heat of the fuel cell for the internal combustion engine, a thermal coupling of the fuel cell and the internal combustion engine is provided.

15 Claims, 1 Drawing Sheet

SYSTEM HAVING AN INTERNAL COMBUSTION ENGINE AND A FUEL CELL AND METHOD OF MAKING AND USING SAME

This application is a continuation of PCT International Application No. PCT/EP02/02260 filed Mar. 2, 2002, and claims priority based on German Patent Application No. DE 101 13 000.7 filed Mar. 17, 2001, the specifications of which are incorporated by reference herein.

BACKGROUND AND SUMMARY OF THE INVENTION

The invention relates to a system comprising an internal combustion engine and a fuel cell, which particularly serves to provide the locomotion of a vehicle, and comprising a fuel cell, which serves, among other things, to generate current for electrical units of the vehicle.

Vehicles that are equipped with both an internal combustion engine and a fuel cell, in which the internal combustion engine serves to provide locomotion for the vehicle, and the fuel cell serves, among other things, to generate current for electrical units of the vehicle, are already known in the state of art.

Until now internal combustion engines and fuel cells have been installed separately from one another. In this manner it is thought, that, because of current space limitations in the installation area, a conventional starter battery should be installed.

However, especially after a vehicle has been switched off, the internal combustion engine and the fuel cell cool down in parallel, allowing the heat that is stored in these units to escape into the atmosphere. Although the fuel cell is usually held within an insulated housing, this only serves to delay the total loss of heat. In today's high-temperature fuel cells, the operating temperature is around 850° C. Following a cooling-off period of 1, 2, 4, or 7 hours, the temperature of current state-of-the-art fuel cells decreases to 750° C., 650° C., 600° C., or 400° C., respectively. Due to this cooling effect, the system-optimizing potential that would result from combining the heat from the internal combustion engine and the fuel cell cannot be fully utilized. The internal combustion engine cools off relatively rapidly, so that when the engine is restarted, the emission disadvantages of a cold start must also be taken into account.

An aspect of the present invention is thus to provide a system that comprises an internal combustion engine and a fuel cell, in which the above-named disadvantages are avoided to the greatest possible extent.

This aspect may be attained in that the fuel cell is thermally coupled to the internal combustion engine. In particular, the design involves a thermal coupling of the internal combustion engine, in other words the internal combustion engine of the vehicle, and the fuel cell. In accordance with one design, the thermal coupling is achieved in that the fuel cell is positioned on the engine block of the internal combustion engine, or is at least partially integrated into the engine block.

With a design in which the thermal insulation on the primary drive side is less prominent than the thermal insulation on the other sides of the fuel cell block, a thermal exchange is promoted in this location. This effect can be intensified via measures designed to improve heat conductivity between an insulation box and the engine block.

Alternatively, the heat from the fuel cell can be temporarily stored in a heat accumulator, and supplied to the internal combustion engine as needed.

In accordance with a further alternative, it is possible for the thermal coupling to be implemented via a fluid circuit, via which the heat from the fuel cell system is transferred to the internal combustion engine. The cooling circuit for the internal combustion engine is especially well suited for this purpose, and, in accordance with a special design, can be driven by the fuel cell.

Overall, with the measures described above, heat exchange effects between the fuel cell and the internal combustion engine can result, whereby the energy consumed by the vehicle when it is restarted, and the emission data, are improved by utilizing the lost heat from the fuel cell. Furthermore, it is possible to activate the fuel cell independent of primary engine operation, for example for engine-independent air conditioning or heating, or when the vehicle is stationary. In this case, the lost heat given off by the fuel cell contributes to heating the internal combustion engine. Overall, then, the internal combustion engine remains at a temperature level that, for example, eliminates the necessity of cold-start enrichment, along with the associated disadvantages related to fuel consumption.

Other objects, advantages and novel features of the present invention will become apparent from the following detailed description of the invention when considered in conjunction with the accompanying drawings.

DETAILED DESCRIPTION OF THE DRAWINGS

Figure 1:
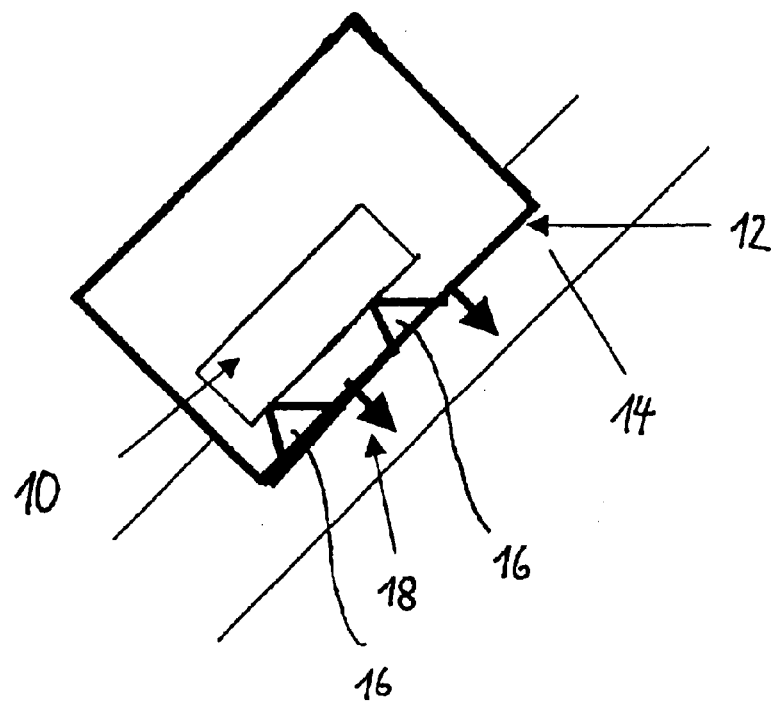
FIG. 1 shows a schematic block diagram of one design of the present invention.

With the design of the present invention shown in FIG. 1, a high-temperature fuel cell 10 is embedded within an insulating unit 12 and forms the so-called APU (Auxiliary Power Unit). This APU is embedded in a recess in the engine block 14, which is only schematically indicated here. In addition, the insulation on the side of the fuel cell 10 which faces the engine block 14 is less pronounced, as a result of the generation of a solid-state thermal conduction, than the insulation on the other side of the fuel cell, for example the side that faces away from the engine block.

The high-temperature fuel cell 10 and its hot adjacent units are fastened to the engine block via brackets 16.

The exchange of heat from the fuel cell 10 to the engine block 14 is indicated by the arrow 18, which is intended to symbolize thermal conduction or thermal radiation. When the high-temperature fuel cell is in operation, its temperature is approximately 800° C. On the outer side of the insulating unit 12 that faces away from the engine block, the temperature is approximately 45° C. On the contact surface to the engine block 14, the temperature is approximately 100° C. The insulating unit 12 is designed such that the technically unavoidable heat losses experienced during operation of the fuel cell while the vehicle is stationary (e.g. during engine-independent air-conditioning or heating, or for the so-called boil-off conversion of cryogenic fuels) are largely transferred to the engine block, making this heat available for use by the engine. If the engine is then switched-off when it is hot from operation, it retains the lost heat from the APU, which has also been switched off, at a temperature greater than 40° C. for a certain period of time. In this phase the necessity of an enrichment of the air/fuel mixture, which would otherwise be essential for a cold start, is eliminated. In driving, the thermal transport processes between the APU and the internal combustion engine are nearly zero, because the temperature level of the engine block is similar to that of the side of the fuel cell or the side of the fuel cell box that is adjacent to the engine block.

Of course, the thermal coupling may be achieved in a manner other than mounting the fuel cell on or in the engine block. For example, a thermal coupling could be accomplished or improved via solid-state thermal conduction or via indirect conduction using latent heat accumulators or an active fluid transport.

Figure 2:
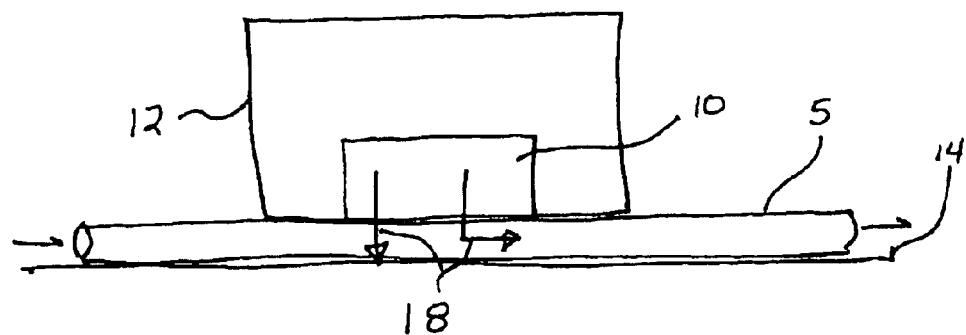
FIG. 2 shows a block diagram of another embodiment.

The heat accumulator is provided, which is connected to, or can be connected to the fuel cell, and can be supplied with thermal energy from the fuel cell, and can be coupled with the internal combustion engine, in order to supply its heat to the internal combustion engine. The thermal coupling can be implemented via a fluid circuit 4 as shown in FIG. 2. The fluid circuit can be thermally coupled with both the fuel cell and the engine. The fluid circuit can further be integrated or combined with the cooling circuit 5 of the engine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system comprising:
    an internal combustion engine, which serves to provide locomotion of a vehicle; and
    a fuel cell, which serves at least to generate current for electrical units of the vehicle; wherein,
    the fuel cell is thermally coupled to the internal combustion engine; and
    the fuel cell is located on an engine block of the engine or is at least partially integrated into the engine block.

2. The system according to claim 1, wherein the fuel cell is less thermally insulated on a side that faces the engine than on other sides.

3. The system according to claim 1, wherein, in an area of contact between the fuel cell and the engine, means are provided for improving thermal transfer.

4. The system according to claim 1, wherein solid-state thermal conduction is produced via mounting components of the fuel cell in the engine block.

5. A system comprising:
    an internal combustion engine, which serves to provide locomotion of a vehicle; and
    a fuel cell, which serves at least to generate current for electrical units of the vehicle; wherein,
    the fuel cell is thermally coupled to the internal combustion engine; and
    the fuel cell is less thermally insulated on a side that faces the engine than on other sides.

6. The system according to claim 5, wherein, in an area of contact between the fuel cell and the engine, means are provided for improving thermal transfer.

7. The system according to claim 5, wherein solid-state thermal conduction is produced via mounting components of the fuel cell in the engine block.

8. A system comprising:
    an internal combustion engine, which serves to provide locomotion of a vehicle; and
    a fuel cell, which serves at least to generate current for electrical units of the vehicle; wherein,
    the fuel cell is thermally coupled to the internal combustion engine; and
    in an area of contact between the fuel cell and the engine, means are provided for improving thermal transfer.

9. The system according to claim 8, wherein solid-state thermal conduction is produced via mounting components of the fuel cell in the engine block.

10. The system according to claim 8, wherein a heat accumulator is provided, which is connectable to the fuel cell, suppliable with thermal energy from the fuel cell, and couplable with the engine, in order to supply heat to the engine.

11. The system according to claim 10, wherein a latent heat accumulator is provided as the heat accumulator.

12. The system according to claim 8, wherein thermal coupling is provided between the fuel cell and the internal combustion engine, implemented via a fluid circuit.

13. The system according to claim 12, wherein the fluid circuit is thermally coupled with both the fuel cell and the internal combustion engine.

14. The system according to claim 13, wherein the fluid circuit is combined with a cooling circuit of the engine.

15. A system comprising:
    an internal combustion engine, which serves to provide locomotion of a vehicle; and
    a fuel cell, which serves at least to generate current for electrical units of the vehicle; wherein,
    the fuel cell is thermally coupled to the internal combustion engine; and
    solid-state thermal conduction is produced via mounting components of the fuel cell in the engine block.

* * * * *